Aug. 24, 1926.
J. J. SELLINGER ET AL
1,597,627
FAUCET
Filed July 21, 1925
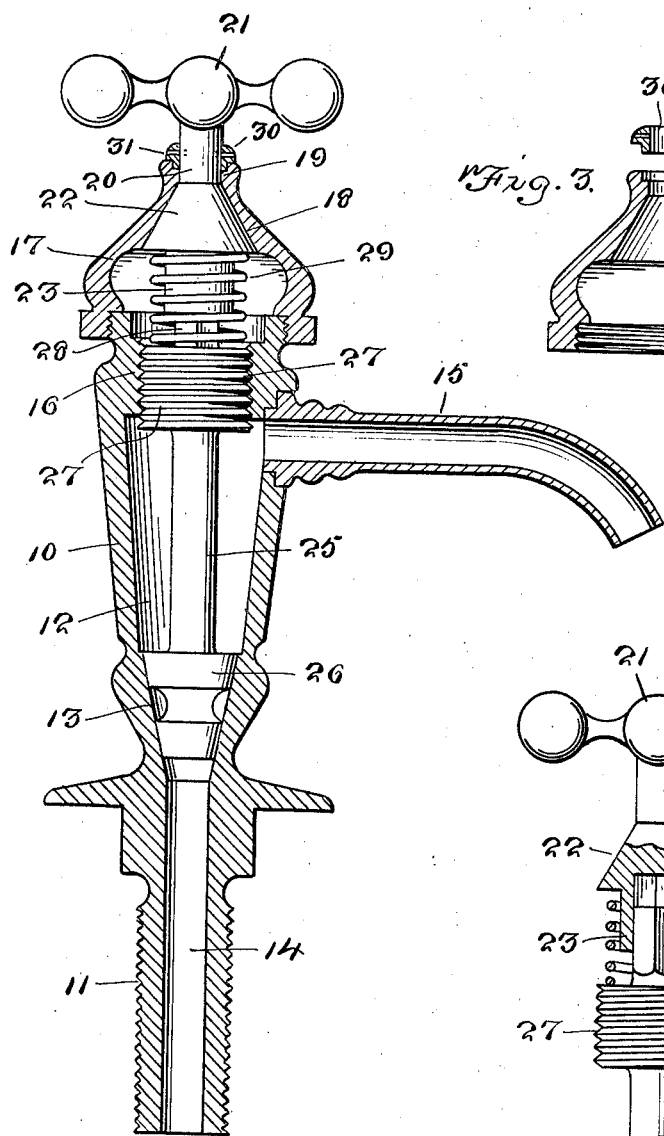
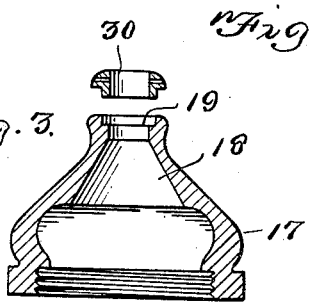
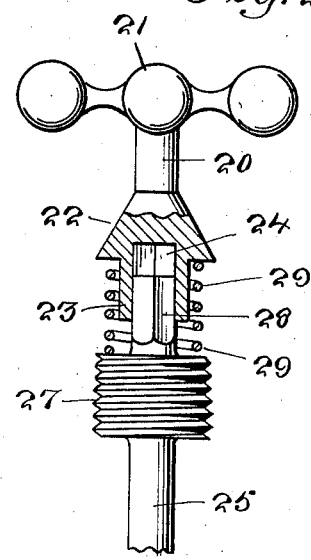
J. J. Sellinger
L. Bertanyi
INVENTOR
BY Victor J. Evans
ATTORNEY
WITNESS:

Patented Aug. 24, 1926.

1,597,627

UNITED STATES PATENT OFFICE.

JOHN J. SELLINGER AND LESLIE BERTÁNYI, OF ROXBURY, MASSACHUSETTS.

FAUCET.

Application filed July 21, 1925. Serial No. 45,103.

This invention relates to the broad subject matter of valves and has for its object the provision of a novel faucet so constructed and arranged as to be substantially if not entirely leak-proof even though handled and treated carelessly.

An important object is the provision of a faucet embodying conical elements one of which constitutes the closer for cutting off the flow of water and the other of which constitutes a packing for the cap, the device being moreover screw operated and provided internally with spring means operating to hold the upper member against its seat and prevent leakage which so often occurs at this point.

An additional object is the provision of a device of this character which will be simple and inexpensive in manufacture, easy to assemble and use, positive in action, efficient and durable in service, and a general improvement in the art.

With the above and other objects and advantages in view, the invention consists in the details of construction and the arrangement and combination of parts to be hereinafter more fully described and claimed, and illustrated in the accompanying drawing, in which:

Figure 1 is a longitudinal section through the complete device.

Figure 2 is a detail section through the upper portion of the movable member.

Figure 3 is a detail section through the cap, and

Figure 4 is a detail section through the element preventing longitudinal displacement of the upper packing member.

Referring more particularly to the drawings, we have shown the device as comprising an elongated upright body 10 of suitable size, shape and material threaded at its lower end as indicated at 11 to facilitate connection with a supply pipe, not shown. This member 10 is provided with a chamber 12 at its intermediate portion and below this chamber is a tapered seat 13 located above the bore 14 formed in the lower threaded end 11. This body is open at its upper end and externally threaded and is provided at one side with a nose piece 15 for the discharge of water. At a point spaced slightly below the open upper end but above the outlet nose 15 this body has a thickened wall portion 16 which is internally threaded as shown.

Screwed onto the threaded upper end of the body is a cap 17 formed with a tapered seat 18 and provided with an opening 19 through which is journaled the shank 20 of the handle or turning key 21. The handle proper of this turning means must of course be detachably mounted, as is customary, in order to permit assembling of the device for the reason that the shank 20 terminates at its lower end in a conical portion 22 fitting within the tapered seat 18. Below this conical portion is an extension 23 having a rectangular socket 24 therein.

The valve for controlling the flow of water through the device comprises an elongated stem 25 having its lower end formed with a tapered head 26 fitting snugly within the seat 13. At an intermediate point the stem 25 has a threaded enlargement 27 thereon screwed into the threaded hole in the thickened portion 16 at the upper end of the body. Above this enlargement 27 the stem 25 is provided with an angular extension 28 slidably engaged within the socket 24. A coil spring 29 surrounds the extension 28 and the extension 23 and abuts against the upper surface of the enlargement 27 and the under-surface of the conical portion 22 for the purpose of normally urging the latter into close engagement with its seat 18.

In the operation of the device, it will be seen that normally, that is when the valve is in closed position so that the water will be cut off the tapered enlargement or valve head 26 fits snugly within the seat 13. The spring 29 of course urges the conical portion 22 into engagement with the upper seat 18 in the cap so as to prevent leakage at this point. When it is desired to turn on the water, it is merely necessary to turn the handle member 21 to the left in the usual manner whereupon the engagement of the angular socket 24 with the angular extension 28 will cause the threaded enlargement 27 to be rotated in a counter-clockwise direction, thus causing the stem 25 and valve head 26 thereon to be moved upwardly out of engagement with the seat 13 so that water may flow into the chamber 12 and thence out through the nosepiece 15. As this movement occurs, it will be observed that the extension 28 advances into the socket 24, the conical member 22 never having any longitudinal movement whatsoever but remaining always firmly against the seat 18, It sometimes happens that persons using spigots press downwardly on the handle. In the present instance, that might have a tendency to compress the spring 29 and cause disengagement of the conical member 22 from its seat 18. For this reason, we prefer to use a ring 30 engaged upon the shank 20 of the turning member and held thereon by means of suitable screws or other fastening devices indicated at 31. This ring is located above the upper end of the cap 17 and will positively prevent any downward movement of the turning member.

From the foregoing description and a study of the drawings, it is believed that the construction, operation and advantages will be readily apparent to one skilled in the art without further explanation.

While we have shown and described the preferred embodiment of the invention, it is to be understood that we reserve the right to make such changes in the form, construction and arrangement of parts as will not depart from the spirit of the invention or the scope of the subjoined claim.

Having thus described the invention, we claim:

In a faucet of the character described, an elongated body of hollow formation provided at one side with an outlet and provided at its lower end with a bore, a tapered seat located at the upper end of the bore, a cap detachably engaged upon the upper end of the body and having a conical seat therein, said body internally threaded at a point above the outlet, a stem within the body and carrying a head at its lower end cooperating with said first named seat and of corresponding formation, a threaded enlargement on the intermediate portion of the stem screwed into the threaded portion of the body, said stem terminating at its upper end in a squared extension, a handle member having a shank rotatably mounted through the cap and terminating in a conical portion bearing against said second named seat, said conical portion having an extension thereon formed with an angular socket receiving said squared extension, and spring means normally urging said second named conical portion to its seat.

In testimony whereof we affix our signatures.

JOHN J. SELLINGER.
LESLIE BERTÁNYI.